July 24, 1928.                                                    1,678,110
F. A. FAHRENWALD
APPARATUS FOR TESTING ABRASION RESISTANCE
Filed Dec. 16, 1926          2 Sheets-Sheet 1

Frank A. Fahrenwald
INVENTOR

BY Smith & Freeman
ATTORNEYS

July 24, 1928.

F. A. FAHRENWALD 1,678,110

APPARATUS FOR TESTING ABRASION RESISTANCE

Filed Dec. 16, 1926 2 Sheets-Sheet 2

Frank A. Fahrenwald
INVENTOR

By Smith & Freeman
Attorneys

Patented July 24, 1928.

1,678,110

UNITED STATES PATENT OFFICE.

FRANK A. FAHRENWALD, OF CHICAGO, ILLINOIS.

APPARATUS FOR TESTING ABRASION RESISTANCE.

Application filed December 16, 1926. Serial No. 155,185.

This invention relates to a machine for testing abrasion resistance. It is known that different metals and alloys differ substantially in their wear-resisting qualities, owing to their chemical composition, metallurgical treatment, crystal growth, grain development, hardness, porosity, ductility, temper, and other conditions, and that this resistance can be varied substantially by changes in the chemical composition and physical treatment, but no easy laboratory method or practical machine has been known whereby such abrasion resistance could be measured, either absolutely or comparatively. The objects of the present invention are the provision of a simple and reliable machine whereby samples of different substances can be compared directly with each other as to their abrasion resisting qualities; the provision of a machine wherein, by the application of severe conditions through a short period of time, one can obtain an accurate measure of the wearing qualities of given materials throughout a long period of time; the provision of a simple, compact, machine whereby the abrasion-resisting or wearing character of different materials can be measured under varying degrees of pressure, speed, and surface conditions; the provision of a machine of this character wherein different abrasives or different lubricants can be used at will; while further objects and advantages of the invention will become apparent as the description proceeds.

Figure 1:
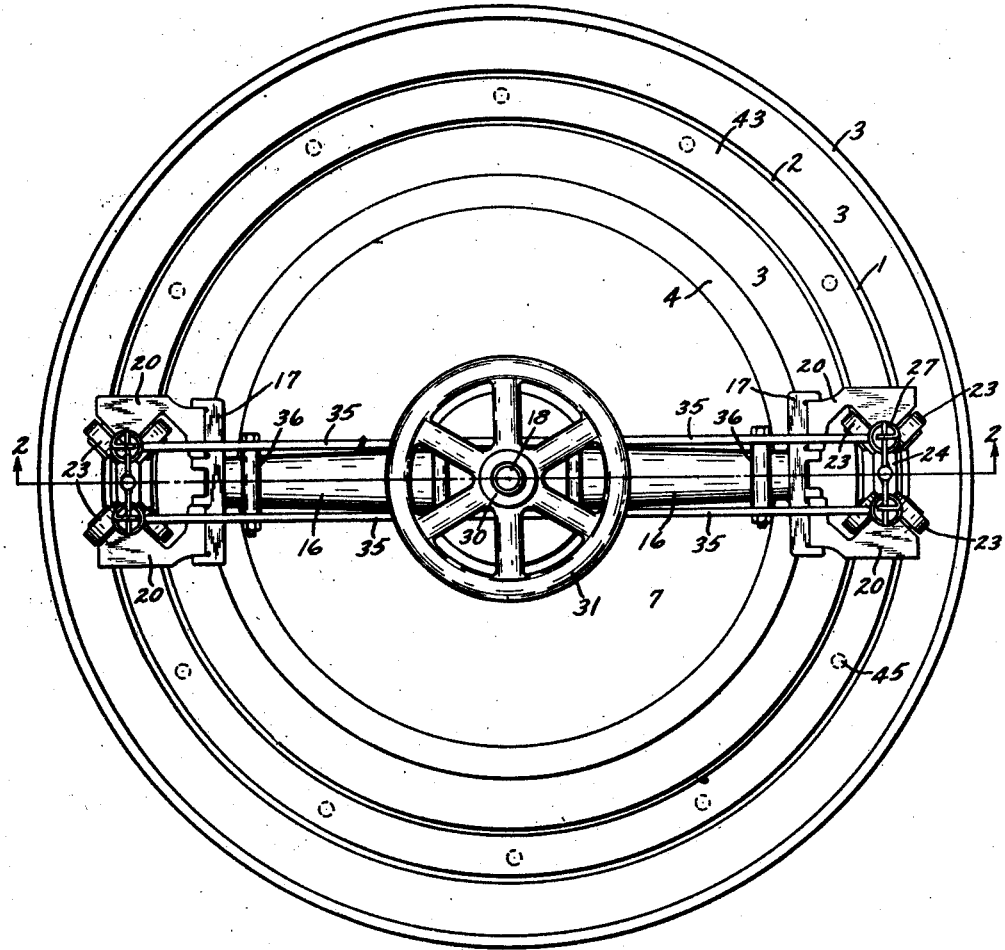
Figure 4:
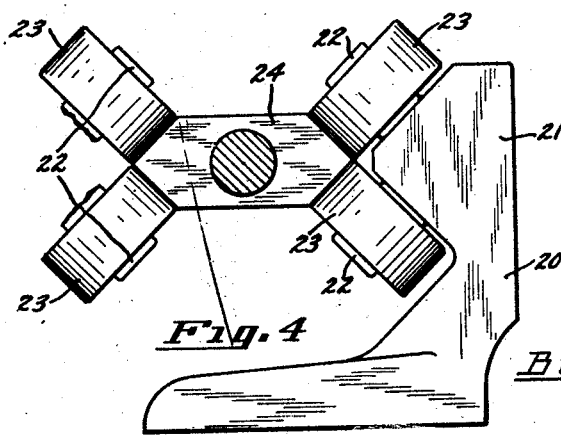
Figure 6:
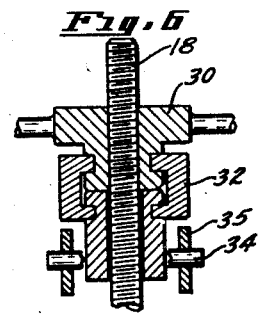
Figure 2:
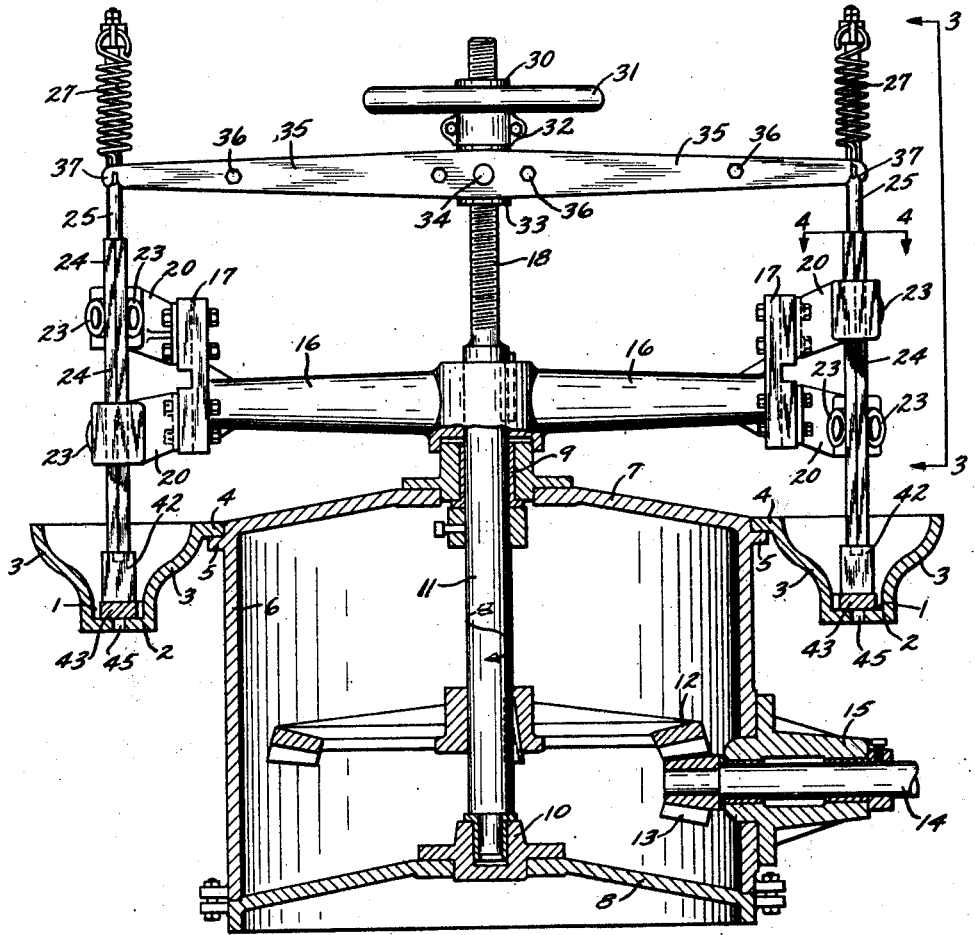
Figure 3:
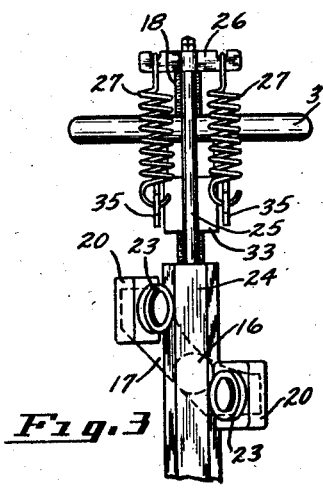
Figure 5:
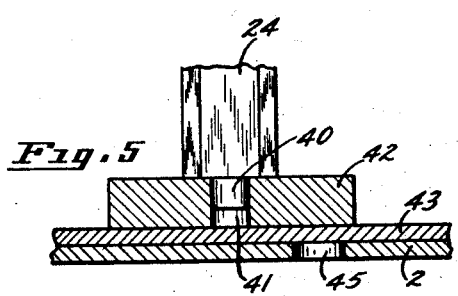

In the drawings accompanying and forming a part of this application I have illustrated diagrammatically a preferred physical embodiment of my inventive idea. wherein Fig. 1 is a top plan view of my improved abrasion testing apparatus; Fig. 2 is a central sectional view through the machine shown in Fig. 1 upon the line 2—2; Fig. 3 is a partial side elevation corresponding to the line 3—3 of Fig. 2; Fig. 4 is a horizontal sectional view corresponding to the line 4—4 of Fig. 2 and looking downwardly; Fig. 5 is a detail vertical sectional view taken through the testing trough in circumferential direction; and Fig. 6 is a detail section corresponding to the line 6—6 in Figs. 1 and 2.

My improved testing machine comprises essentially an annular raceway, surrounding an axial rotatable shaft which carries suitable arms to which are attached the blocks to be tested in such wise as to be pressed against said raceway by an adjustable, balanced pressure, said raceway being made of or floored with some substance against which the abrasion is to be effected. This raceway preferably takes the form of a trough as illustrated at 1, comprising a flat bottom 2 and upwardly sloping sides 3—3, the inner side wall being formed with a horizontal annular lip 4 which rests on a flange 5 carried by the base 6 of the machine, which is made in the form of a hollow pedestal having cylindrical sides terminated by a top 7 and bottom 8. The top 7 is provided with a central, upright, bearing-sleeve 9, and the bottom 8 with a central, upright, thrust-bearing 10, in which is rotatably mounted the vertical shaft 11 coaxial with the trough 1; and tightly secured to this shaft, inside the base, is a bevel gear 12 meshing with a pinion 13 carried by the drive shaft 14 which in turn is journaled in a horizontal bearing member 15 carried by the base.

The shaft 11 projects above the bearing sleeve 9 where it is first provided with a pair of rigid arms 16—16 having suitable branches 17—17 at their outer ends; and above these arms the shaft 11 is prolonged in the form of an upright screw-threaded extension 18. Secured to each of the branches 17 is a bracket member 20 provided with a supporting head 21 which is located vertically above the trough 1. This head has two faces 90° apart, and both arranged with their planes vertical and at an angle of 45° to the radius of the shaft; and journaled on horizontal bosses 22 carried by these faces are cylindrical rollers 23 which fit the properly shaped sides of the vertical carrying bars 24. In the present embodiment each of these bars consists of a flat sided metal member arranged with its flat sides perpendicular to the radius of the shaft and having its edges beveled to an angle of 45° for coaction with the rollers 23. The two arms 16—16 being opposite to each other and symmetrically arranged, two of these carrying bars are used.

The upper end of each of these bars is prolonged in the form of an elongated vertical rod 25 provided at the top with a horizontal yoke 26 to which is attached a coil spring 27, these springs depending one on each side of the rods 25. Threaded on the shaft 18 is the hub 30 of a hand-wheel 31, to which hub is swiveled, by a suitable clamp 32, a sleeve 33 which slidably engages the screw 18 and is provided with horizontally projecting trunnions 34 on which are pivoted the equalizer arms 35—35. These arms are here shown as consisting of straight metal strips, spaced one on each side of the sleeve, and secured together by suitable connections 36, the outer ends of said arms being notched at 37 for the reception of the lower ends of the springs 27.

The lower end of each of the bars 24 is preferably provided with an extension or tenon 40 adapted to enter a corresponding depression or mortise 41 formed in the test block 42. The bottom of the trough 1 defines a plane to which the shaft 1 is normal, and in order to protect the machine from wear, the bottom of this trough is at all times covered and shielded by a removable wear-plate 43 against which the testing blocks 42 bear.

The effect of the machine is to compare abrasion resistance by direct test of two materials under identical conditions. A block of one of the materials being attached to each of the bars 24, the shaft 11 is rotated in the direction shown by the arrow so as to cause both blocks to pass around the trough. Any desired degree of pressure is imposed on the blocks by adjusting the wheel 31, and the pivotal arrangements of the arms 35 equalizes the pressure on these blocks despite inequalities in the stiffness of the various springs. Furthermore this construction equalizes the pressure despite a considerable inequality in the height of the bars 24—24 caused by an unequal wearing away of the test blocks. It is also possible, by suitably choosing the material of the wear-plates 43, to ascertain the wearing effect of one material against another. It is not always necessary to employ blocks of different materials at opposite ends of the arms inasmuch as it is sometimes desirable to make time tests employing blocks of the same material. The trough arrangement also enables the employment of different abrasive agents if desired, or of different lubricants. I have shown the bottom 2 of the trough as formed with spaced apertures 45 to facilitate the discharge of the abrasive or lubricant after the completion of such a test.

It will be noted that in the present embodiment no provision is made for any driving of the arms 35 excepting by the action of the bars 24, and the friction of the screw 18. The entire driving is effected by the arms 16—16, thereby minimizing the likelihood of any binding of the bars 24. It will be understood, however, that a great many changes in this and other details of the apparatus can be made within the scope of my invention and that I do not limit myself to any of the features of construction or arrangement hereinbefore described except as the same are specifically recited in my several claims.

Having thus described my invention what I claim is:

1. A machine for testing abrasion resistance, comprising a circular raceway, a rotatable shaft coaxial with said raceway and normal to the plane thereof, arms rigid with said shaft, a plurality of carriers carried by said arms and vertically movable relative thereto and traversing said raceway, means for rotating said shaft, and means for forcing said carriers toward said raceway with predetermined force, said carriers adapted to receive specimens of materials to be abraded.

2. A machine for testing abrasion resistance, comprising a circular upwardly facing trough, a rotatable shaft coaxial with said trough and normal to the plane thereof, carriers rotatable with said shaft and adapted to traverse said trough as said shaft is rotated, means for securing the articles to be abraded rigidly to said carriers, means for pressing said articles into said trough with an adjustable pressure, and means for rotating said shaft.

3. In a machine for testing abrasion resistance, in combination, a circular raceway, a rotatable shaft coaxial with said raceway and normal to the plane thereof, arms carried by said shaft, carriers mounted on said arms and movable parallel to said shaft, means preventing relative movement between said carrier and arms otherwise than parallel to said shaft, means including an equalizing lever for pressing said carriers towards said raceway, means for securing articles to be tested to said carriers, and means for rotating said shaft.

4. In a machine for testing abrasion resistance, in combination, a circular raceway, a rotatable shaft coaxial with said raceway and normal to the plane thereof, carriers movable around said raceway, radial arms carried by said shaft and engaging said carriers in movement-producing relation, said carriers being freely movable relative to said arms in a direction normal to the plane of said raceway, means rotatable with said shaft for simultaneously imposing pressure on both said carriers, and means for rotating said shaft.

5. In a machine for testing abrasion resistance, in combination, a circular raceway, a rotatable shaft coaxial with said raceway and normal to the plane thereof, a pair of carriers movable about said raceway and adapted for the reception of the materials to be tested, means carried by said shaft for moving said carriers about said raceway, means carried by said shaft independently of said first means for pressing said carriers toward said raceway, and means for rotating said shaft.

6. In a machine for testing abrasion resistance, in combination, a circular raceway, a rotatable shaft coaxial with said raceway and normal to the plane thereof, carriers movable about said raceway, means carried by said shaft for simultaneously imposing and equalizing pressure on said carriers, means carried by said shaft independently of said first means for moving said carriers about said raceway, and means for rotating said shaft.

7. In a machine for testing abrasion resistance, in combination, a circular raceway, a rotatable shaft coaxial with said raceway and normal to the plane thereof, a pair of carriers at opposite sides of said shaft and movable about said raceway, a sleeve movable along said shaft, an equalizer bar pivoted to said sleeve and having its ends connected to said carriers, and a pair of positively projecting rigid arms carried by said shaft and engaging said carriers in driving relation.

8. An abrasion testing machine comprising an annular horizontal trough, a vertical driving shaft coaxial with said trough, carriers operatively connected to said drive shaft and movable about said trough, and means for rotating said drive shaft, said carriers being formed for the reception of blocks of material to be tested.

9. An abrasion testing machine comprising an annular horizontal trough, a vertical driving shaft coaxial with said trough, carriers operatively connected to said drive shaft and movable about said trough, means for rotating said drive shaft, said carriers being formed for the reception of blocks of material to be tested, and plates of the material to be tested lying in said trough.

10. In a device of the character described in combination a circular horizontal trough, a vertical rotatable shaft coaxial therewith, carriers for test blocks, means carried by said shaft for moving said carriers around said trough, and means for regulating the pressure of said test blocks against the trough.

In testimony whereof I hereunto affix my signature.

FRANK A. FAHRENWALD.